Patented Feb. 17, 1948

2,436,359

UNITED STATES PATENT OFFICE 2,436,359

STIMULATION OF PRODUCTION OF OLEO-RESINS AND GUMS IN CONIFEROUS TREES

George H. Hepting, Asheville, N. C., assignor to the United States of America, as represented by the Secretary of Agriculture No Drawing. Application November 18, 1947, Serial No. 786,600

9 Claims. (Cl. 47—10)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to me of any royalty thereon.

This application is a continuation-in-part of Hepting application Serial No. 731,198, filed February 27, 1947.

This invention relates to a method of increasing the flow of oleoresins or gums from cut surfaces of trees. It relates in particular to stimulating the flow of resins from artificial wounds in the trunks of coniferous trees, such as Virginia pine, slash pine, shortleaf pine, and longleaf pine. It further relates to a method of stimulating, or increasing, the infiltration of, or content of, pitch in wood of trees or stumps of trees, whereby greater yields of naval stores are obtained upon felling the trees or pulling the stumps, and distillation of the wood.

One object of this invention is the application of a stimulating agent that results in a long-sustained, or year-long flow of oleoresin from pines without additional chipping of the trees. This permits the working of smaller trees, with less damage to the trees. It also makes profitable the utilization of additional pine species in the turpentine belt.

Another object is the application of a stimulating agent to the wood of coniferous trees, or stumps of such trees, to increase the content of pitch in the wood.

Oleoresins are natural combinations of resinous substances and essential oils occurring in or exuding from plants. For a great many years, oleoresins used in the manufacture of turpentine and rosin have been obtained in commercial quantities by chipping the bark and wood of living pine trees and collecting the exuding oleoresins or gum in containers. In recent years it has been found that the gum flow from chipped trees could be increased by applying chemicals such as sulfuric acid and sodium hydroxide to the freshly chipped surfaces. To secure a continuous flow of gum, with or without the application of chemicals, it is necessary to expose freshly cut surfaces through frequent repetitions of the chipping process. The invention herein described provides a method of stimulating a continuous flow of gum over long periods without rewounding the tree.

When applied to pine trees, my new process, in one aspect, comprises the stimulation of a copious flow of oleoresin from the trunks of pine trees by the action of a fungus that is introduced through gouged streaks such as are employed in turpentining, or through punch holes or other wounds in the bark or wood. In its broader aspect, the process contemplates the use of fungus or other living organisms.

I have found that a species of Fusarium fungus isolated from pitch cankers of Virginia pine, when introduced into artificial wounds made in the trunks of Virginia pine, shortleaf pine, and longleaf pine, will induce a copious and long-continued flow of oleoresin. This species of Fusarium fungus causes pitchy cankers on young branches and stems of Virginia pine (*Pinus virginiana* Mill.) and to a lesser extent attacks shortleaf and pitch pines (*P. echinata* Mill. and *P. rigida* Mill.).

In my process, the pitch canker fungus is isolated and grown in pure culture on Tochinai liquid or other suitable culture media. The fungus sports or mycelium obtained from the culture were applied to tree wounds such as punch holes or gouged streaks through the bark or wood. The presence of the fungus in the tissues stimulates a copious flow of oleoresin that continues for a period of many weeks or months. Suitable containers such as those customarily employed in turpentining are attached to the tree trunk below the wounds, to receive the exuding oleoresin or gum.

In illustration and in proof of the effectiveness of the process, a number of Virginia pines were inoculated with an active culture of pitch canker fungus through gouged streaks in the bark. A heavy continuous flow of oleoresin exuded from these streaks for a number of months, without additional chipping or additional inoculation. On each of these trees, a gouged streak was left uninoculated to serve as a check. From these check streaks there was very little flow of gum, which soon ceased entirely.

The tests were repeated on Virginia pine, shortleaf pine, and longleaf pine. Trunks of several trees of these species were inoculated with pitch canker fungus through punch holes through the bark to the wood. Check experiments were run on these same trees by leaving punch holes untreated. Punch holes to which the active fungus was applied yielded as high as 126 cubic centimeters of gum in 74 days, whereas punch holes on this same tree that were uninoculated produced only 4 cubic centimeters of gum over the same period of 74 days.

The Fusarium fungus employed in my invention has the significant advantage that its use does not constitute a hazard to the forests for the following reasons. This fungus sporulates rarely on the cankers formed on the trees. This fungus does not advance rapidly from the point of inoculation on the trunks of susceptible pines. Its progress is more notable in a vertical than in a horizontal direction. Therefore, there is no rapid girdling of the inoculated trees used for turpentining. The vertical advance of the fungus in the tissues does not destroy them any faster than is done through the process of repeated chipping, such as is employed in the ordinary turpentining of pine trees.

While the process has been described as particularly applicable to pines and other coniferous trees, wider application is within its broad purview, comprehending stimulation of secretions from other kinds of plants. In its broader aspects the process includes adaptation to obtain:

a. Increased production of dammar, a resin derived from various evergreen trees and used mostly for making colorless varnish.

b. Increased production of spruce gum, a resinous exudation from the white spruce, the black spruce, or the balsam fir, used as a chewing gum.

c. Increased production of the resin secreted by Jeffrey pine in California and elsewhere, from which heptane, a hydrocarbon, can be prepared.

As already indicated, the process is also applicable in the production of naval stores by steam or destructive distillation of the wood. When the inoculation described above is applied to trees which have been subjected to scarifying and to turpentine collection, the infiltration of pitch into the wood of the trees about the wounds is increased. When the collection of turpentine from the tree is no longer profitable, and the tree is chopped down, the resulting pitch-soaked butts are more valuable to the wood distillation industry.

By applying the process to the upper part of turpentined trees, the infiltration of pitch in the upper part can be increased.

In a series of tests on Virginia, shortleaf, longleaf, and slash pines, in which the Fusarium fungus described above was introduced through punch holes or gouged streaks through the bark in the trunks, it was found that the wood around the inoculations became infiltrated with pitch. Tests on uninoculated control samples of these trees resulted in a much lower degree of pitch infiltration.

My method is also applicable to trees hitherto considered to be of low value to the naval stores industry. It is applicable to coniferous species that are not generally turpentined. The new method increases the supply of, and the quality of, wood suitable for the wood naval stores industry, and helps provide a replenishing source of raw materials for distillation.

Having thus described my invention, I claim:

1. The method of producing increased production of oleoresins and gums in coniferous treewood comprising wounding the coniferous bark and living sapwood, and applying to the wound a species of Fusarium fugus present in pitchy cankers of *Pinus virginiana* Mill.

2. The method of obtaining increased flow of oleoresins and gums from coniferous trees comprising wounding the living tree and applying to the wound a substantially pure culture of pitch canker Fusarium fungus obtained from pitchy cankers on pines.

3. The method of obtaining increased flow of oleoresins and gums from pines comprising applying to an artificial wound on the trunk of the pine a culture of a species of Fusarium fungus that is present in pitchy cankers of *Pinus virginiana* Mill.

4. The method of obtaining oleoresins, gums, and the like from coniferous plants comprising wounding the surface of the plant and applying to the wound a cultured living organism that stimulates and increases the flow of oleoresins and gums said organism being pitch canker Fusarium fungus obtained from pitchy cankers on pines.

5. The method defined in claim 2 in which the wound is in the trunk of the tree.

6. The process described in claim 1 and in which the resulting pitch-infiltrated wood of the tree is subjected to distillation to produce naval stores.

7. The process described in claim 1, and collecting the oleoresins and gums exuding from said wound.

8. The process comprising stimulating the infiltration of pitch into the wood of a standing, living, tree stump by applying to a wound in said stump a species of Fusarium fungus present in pitchy cankers of *Pinus virginiana* Mill.

9. The process of claim 8 in which the pitch-infiltrated stump wood is thereafter subjected to distillation to produce naval stores.

GEORGE H. HEPTING.

REFERENCES CITED

The following references are of record in the file of this patent:

UNITED STATES PATENTS

| Number | Name | Date |
|---|---|---|
| 2,053,031 | Hessenland | Sept. 1, 1936 |

OTHER REFERENCES

Dufrenoy, "Production Pathologique de la Resine et la Gemmage," Biol. Abs., vol. 2, p. 857, entry 9329, published 1928.